United States Patent [19]

Panarello

[11] 4,064,396

[45] Dec. 20, 1977

[54] DYNAMIC LINEARIZATION SYSTEM FOR A RADIATION GAUGE

[75] Inventor: Joseph A. Panarello, Dickson City, Pa.

[73] Assignee: Sangamo Weston, Inc., Springfield, Ill.

[21] Appl. No.: 750,029

[22] Filed: Dec. 13, 1976

[51] Int. Cl.² ............... G01N 23/16; H03K 13/02
[52] U.S. Cl. .................. 364/573; 250/252; 340/347 NT
[58] Field of Search ............ 235/151.3, 150.5, 150.52; 250/252, 272, 393, 308; 340/347 NT, 347 AD

[56] References Cited

U.S. PATENT DOCUMENTS

| | | | |
|---|---|---|---|
| 3,878,373 | 4/1975 | Blum | 235/151.3 |
| 3,939,459 | 2/1976 | Hoopes | 340/347 NT |
| 3,955,086 | 5/1976 | Tsujii et al. | 235/151.3 |
| 3,975,727 | 8/1976 | Mader et al. | 340/347 NT |
| 3,979,745 | 9/1976 | Bishop | 340/347 NT |
| 4,009,376 | 2/1977 | Faraguet | 235/151.3 |

Primary Examiner—Malcolm A. Morrison
Assistant Examiner—Errol A. Krass

Attorney, Agent, or Firm—W. R. Sherman; Kevin McMahon; J. J. Kaliko

[57] ABSTRACT

The disclosed linearization system and process converts a high resolution non-linear analog input signal, representative of the thickness of an object, into a high resolution linear analog output signal suitable for use in driving a variety of output devices. The system requires only a small amount of memory for storing pre-calculated non-linear correction coefficients. Prior art linearization systems typically require large memory configurations and/or powerful computers to develop the output signal from the non-linear input. The known systems do not take advantage of the high resolution inherent in the input signal. The disclosed system "channels" the input signal to separate circuit paths so that it may be used directly to; (1) locate an appropriate correction coefficient; (2) develop a correction term after an appropriate correction coefficient is located; and (3) develop a linearized signal having the same high resolution inherent in the input signal. Finally, the disclosed system processes the linearized signal to compensate for the possible errors introduced by radiation source noise. The processed linearized signal is the high resolution linear analog output signal which accurately represents the thickness of the object being gauged.

11 Claims, 5 Drawing Figures

DYNAMIC LINEARIZATION SYSTEM FOR A RADIATION GAUGE

BACKGROUND OF THE INVENTION

1. Field of the Invention

The invention relates generally to radiation gauges, including x-ray and isotope gauges, used for measuring the thickness of objects. More particularly, the invention relates to linearization systems and processes for use in radiation gauges which preserve the resolution inherent in the non-linear signal throughout the conversion process.

2. Brief Description of the Prior Art.

Radiation gauges are commonly used for determining the thickness of an object, such as a sheet of rolling steel, inserted between a radiation source and a detector located opposite the source. The radiation beam passed through the object is attenuated thereby and the residual beam intensity may be used by the detector to develop a non-linear analog signal representative of the thickness of the object. The non-linear signal is developed in accordance with Bouquer's exponential law of absorption $I = I_o e^{-\mu x}$ where; I is the final (residual) intensity of the radiation detected after the beam has passed through an object the thickness of which is being measured; $I_o$ is the initial intensity of the beam; $\mu$ is the transmission (permeability) coefficient of the object; and x (to be determined) is the thickness of the object.

Photomultiplier tube detectors are commonly used to perform the actual conversion of the residual beam into a non-linear analog signal (a voltage) $V_I$ which varies in accordance with Bouquer's law.

In order to drive a variety of output devices which respond only to a linear signal the non-linear signal developed by the detector, $V_I$, must be converted to linear form. Furthermore, the conversion must result in the development of a high resolution signal in order to accurately indicate the thickness of objects over the entire range of gauge operation.

For the sake of illustration, assume that it is desirable for a gauge to operate within a range of zero volts to 10 volts, i.e., $0 \leq V_I \leq 10$. This is a realistic range of gauge operation and may therefore be used to illustrate the problems associated with prior art linearization approaches. Within this assumed operating range voltages close to zero volts are typically representative of thick objects. Since most of the radiation beam is attenuated by a thick object the residual beam I is of low intensity resulting in the detector developing a low voltage. Conversely, voltages close to 10 volts are representative of thin objects. Assume further, again for the sake of illustration, that it is desirable to produce a linear signal having a one mullivolt resolution over the 10 volt range, i.e., a one part in 10,000 resolution. Several types of linearization systems are known which are capable of developing such a high resolution signal. These systems and their shortcomings will be discussed immediately hereinafter.

The first type of known system employs a memory to store non-linear correction coefficients each of which may be used to develop, typically via a D/A converter, one of the 10,000 voltage levels required to obtain a one part in 10,000 resolution. In these first type systems the non-linear analog signal is used merely to address the memory in order to locate the appropriate correction coefficient. Obviously the memory requirements of such systems are very large. To achieve a one part in 10,000 resolution, 10,000 memory locations are required. A standard 16K memory system is typically employed to provide the required 10,000 memory locations.

An example of a linearization system that utilizes a memory addressed by a non-linear signal to develop a linear output signal may be seen in Muehllehner U.S. Pat. No. 3,745,345, issued July 10, 1973.

A second type of known linearization system minimizes memory requirements by employing a relatively powerful computing system to process the non-linear signal. The computing system directly develops a linear signal corresponding to the non-linear input without having to store all correction coefficient possibilities. Such a system is taught by Tsujii et al. in U.S. Pat. No. 3,955,086, issued May 4, 1976. In particular, Tsujii et al. in FIG. 2 shows "operator" 30 which is a computing system used in conjunction with a D/A converter to directly convert a non-linear signal to a linear signal.

In light of factors such as cost, physical housing constraints, power requirements, etc., it is clearly desirable to be able to develop a high resolution linear analog signal from a non-linear analog signal without requiring either a large memory system or powerful computing device.

A third type of known linearization system operates according to what is hereinafter referred to as a "Standardization" approach. This approach is taught in the Tsujii et al. patent referred to above and is further exemplified by Cho et al. in U.S. Pat. No. 3,729,632, issued Apr. 24, 1973.

According to one Standardization approach an object of known thickness is first inserted into the gauge to develop a first signal representing the standard thickness. This first signal (or digital representation thereof) is compared at some point in time with a second signal (or digital representation thereof) developed when an object of unknown thickness is inserted into the gauge.

The measure of deviation of the second signal from the first signal is indicative of the unknown thickness. As the thickness of the non-standard object increasingly deviates from the sample thickness the probability increases that error is developed in the resulting deviation derived thickness measurement signal. These thickness measurement errors are compounded when linearization is performed. Thus, thickness representative signals generated by a Standardization approach are typically inaccurate.

Finally, a problem common to all known linearization systems is developing output signals which accurately represent object thickness in the noisy environment of a radiation gauge. Statistical fluctuations in the amount of radiation emitted by the radiation source typically appear as variations in gauge output thereby producing gauge output readings which may vary for even the same object.

In light of all of the problems stated hereinabove, it is an object of the invention to develop a high resolution linear analog output signal from a high resolution non-linear analog input signal while requiring only a minimal memory configuration and a minimal amount of computing power.

It is still a further object of the invention to develop a high resolution linear analog output signal representative of the unknown thickness of an object in a "dynamic" manner, i.e., without reference to a standard, to thereby eliminate the aforementioned significant errors typically generated when using a Standardization approach.

Further yet, it is an object of the invention to compensate for the statistical fluctuations in the amount of radiation emitted by the radiation source to thereby yield very accurate gauge output readings.

SUMMARY OF THE INVENTION

A dynamic linearization system and method is disclosed for converting a high resolution non-linear analog input signal into a high resolution linear analog output signal. Advantage is taken of the inherent high resolution of the input signal throughout the conversion process. In particular, the input signal is channeled to separate circuit paths for direct processing at selected points during the conversion process. This is distinguished from the known prior art systems and processes which merely use the input signal once to address a memory or which destroy the signal in the course of operating upon it directly to compute an output signal. This utilization of the high resolution input signal (to be described in detail hereinafter) throughout the conversion process is a significant factor which permits the system to operate with minimal memory and computing power requirements.

According to the invention the channeled input signal is used to (1) locate an appropriate correction coefficient; (2) develop a correction term after locating the appropriate coefficient; and (3) develop a linearized signal having the same high resolution inherent in the input signal. Finally, the disclosed system processes the linearized signal to compensate for possible errors introduced by radiation source noise. In particular, noise compensation is performed by circuitry which develops the final linear output signal by averaging linearized signals developed over a pre-determined time interval.

Expanding on the above outline, the location of an appropriate correction coefficient is performed by using the input signal to address a memory system which stores precalculated correction coefficients. Each coefficient is calculated by well known modeling techniques to be an effective corrective value over a given segment of a curve which represents the range of possible values for the input signal. This curve, referred to as a "non-linear thickness curve", varies as a function of both object thickness and composition. All input signal values in a given segment of the thickness curve are intended to be associated with the single memory location (address) of the pre-calculated correction coefficient for the segment. Typically, an A/D converter may be employed to develop the memory address required to locate the appropriate correction coefficient for any value of the input signal.

Once located, the correction coefficient is converted to analog form and is multiplied, in a separate circuit to which the input signal is channeled, times the input signal. The result is a correction term signal having the same high resolution as the input signal.

Furthermore, according to the invention, the correction term signal range may be scaled, prior to the development of the linear output signal, in accordance with the known distortion inherent in the non-linear thickness curve for a given object.

Next, the high resolution correction term (scaled or unscaled) is summed with the input signal in still another separate circuit to which the non-linear signal has been channeled. The sum forms a new signal (linearized signal) which again has the same high resolution inherent in the input signal. It should be noted that the resolution inherent in the input signal is preserved and taken advantage of throughout the above described conversion process.

Finally, as outlined above, compensation is performed for possible radiation source noise errors introduced into the linearized signal. The resultant signal is the high resolution linear analog output signal.

The invention features a dynamic linearization, i.e., linearization which is performed without reference to a standard or sample object.

A further feature of the invention is its ability to perform high resolution linearization with minimal memory and minimal computing power requirements.

Further yet, the invention features scaling of the correction term range as a function of known non-linear thickness curve distortion. This feature enables the correction term range to be varied without effecting memory size.

Still further, the invention features compensation for possible errors typically introduced into linearization system output signals by radiation source noise.

BRIEF DESCRIPTION OF THE DRAWINGS

These and other objects and features of the invention will become more apparent to those skilled in the art after reading the detailed description set forth herein in conjunction with the Drawing in which.

DETAILED DESCRIPTION OF THE INVENTION

Figure 1:
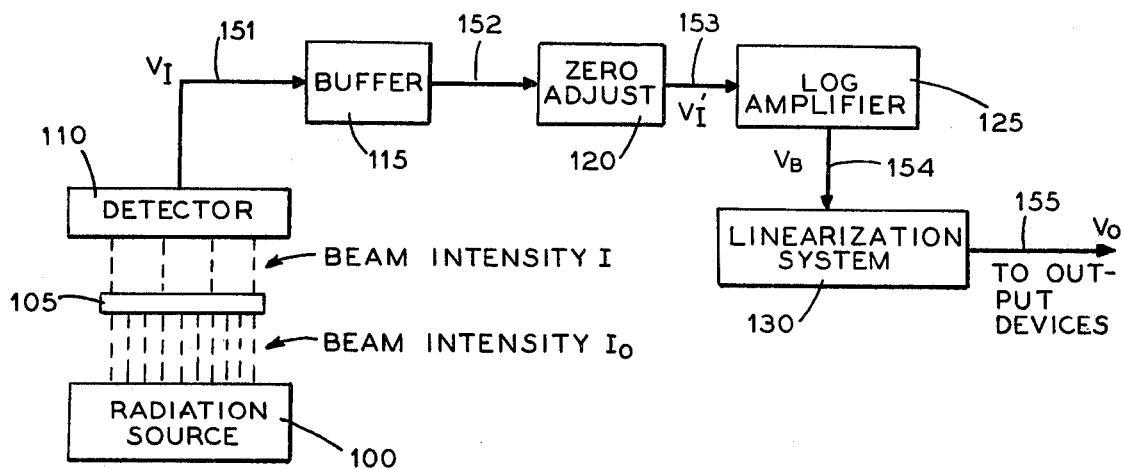
FIG. 1 depicts a block diagram of a radiation gauging system including a linearization system.

FIG. 1 depicts a block diagram of a dynamic radiation gauge that may be used for measuring the thickness of objects. The depicted gauge includes a linearization system 130 for developing signals suitable for driving a variety of output devices shown coupled to the gauge via link 155. Although those skilled in the art may appreciate directly from the Drawing how the depicted gauge operates, a brief overview will first be presented for the sake of completeness.

An object of unknown thickness, shown as sheet 105 in FIG. 1, is inserted between radiation source 100 and a radiation detector, detector 110. As explained hereinbefore, the radiated beam is attenuated by object 105 in accordance with Bouquer's exponential law of absorption. As a result the residual beam I is developed according to the formula $I = I_o e^{-\mu x}$ where $\mu$ is the permeability coefficient of object 105 and $x$ is the unknown thickness of object 105. The residual beam of intensity I is shown in FIG. 1 as the input to detector 110.

Detector 110, typically a photomultiplier tube array, develops a voltage $V_I$ which varies directly with I and thus varies exponentially in accordance with Bouquer's law. Assume, for the sake of illustration only, that $V_I$ is a positive analog signal ranging between zero and ten volts. As stated hereinbefore this is a realistic range for $V_I$ and thus the assumption will help serve hereinafter to illustrate how a typical radiation gauge works.

In most radiation gauging systems the detector output is noisy. The thickness representative signal $V_I$, usually of small magnitude, has to be extracted from the noisy detector output. To perform this extraction buffer circuitry is included in many systems. The radiation gauge of FIG. 1 is shown to include such a buffer, circuit 115, coupled via link 151 to detector 110.

The radiation gauge of FIG. 1 also includes a zero adjust circuit, 120, coupled via link 152 to buffer 115. Many radiation gauges include such a circuit to calibrate the output device (or devices) to read zero when no object is disposed between the radiation source and the detector. Without calibration non-zero readings may occur even when there is no object in the gauge. One reason for this is the frequent build-up on a detector face of dirt or oil. Zero adjust circuitry 120 will compensate for the presence of such build-ups to insure a proper zero reading. Well known zero adjust circuits typically comprise an amplifier (a LM 301A is suitable) in combination with a potentiometer to permit the manual zeroing of gauge output.

The output of zero adjust circuitry 120, $V_I'$ ($V_I$ adjusted for zero compensation), is shown input via link 153 to a log amplifier, 125. Log amplifier 125 operates in a well known manner to convert voltage $V_I'$, which still essentially follows the curve $I = I_o e^{-\mu x}$, to a voltage $V_B$, which follows the curve $A_1\mu x$ where $A_1$ is the gain coefficient of the log amplifier. $A_1\mu x$ is the non-linear thickness curve referred to hereinbefore, which varies with both object thickness and composition. $V_B$ is a non-linear signal since $\mu$, the permeability coefficient, varies as a function of $x$. $V_B$ is the inherently high resolution non-linear analog input signal which must be converted to a high resolution linear analog signal. The linearization is performed by linearization system 130 shown in FIG. 1. The manner in which the linearization is performed is described in detail hereinafter with reference to FIG. 3.

Figure 2A:
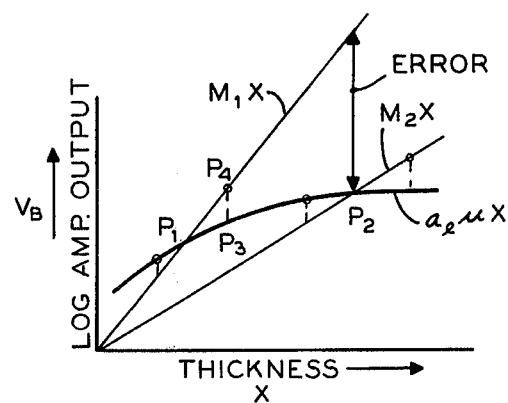
FIG. 2 depicts a set of graphs which show how thickness curves for objects may be approximated by sets of straight lines, i.e., by a linearization process.
Figure 2B:
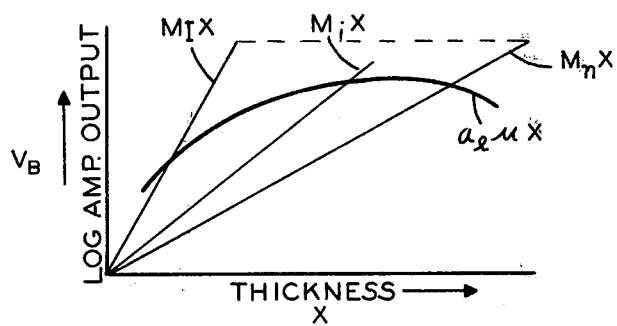
Figure 2C:
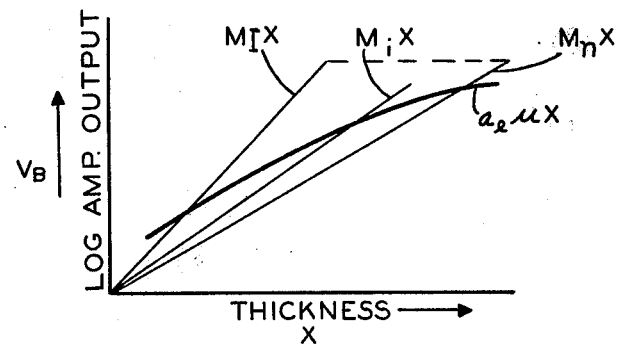

Reference should now be made to FIGS. 2a – 2c to understand how segments of a non-linear thickness curve (curve of the form $A_1 \mu x$ may be approximated with straight lines in accordance with the dynamic linearization process of the invention.

Each of the graphs depicts a non-linear thickness curve, of the form $A_1\mu x$; for a different type (composition) material. The vertical axis of each graph is labeled $V_B$ and represents increasing log amplifier output signal magnitudes above the origin. The horizontal axis of each graph is labeled $x$ and represents increasing object thickness to the right of the origin. Thus, each thickness curve in FIGS. 2a – 2c depicts how $V_B$ varies with the thickness of an object composed of a given type material.

Focusing on FIG. 2a, it should be observed that the straight line with slope $M_1$ intersects curve $A_1\mu x$ at point $p_1$ and that for a small region about point $p_1$ line $M_1 x$ is a good approximation of curve $A_1\mu x$.

It should also be observed that at point $p_2$, line $M_1 x$ would produce significant error if used as the approximating line for $a_1\mu x$. Note, however, that line $M_2 x$ produces a good approximation of curve $A_1\mu x$ for points in a small region of point $p_2$. In short, it should be clear that a set of straight lines with varying slopes may be used to accurately represent small segments of the $A_1\mu x$ curve over the entire curve.

Still referring to FIG. 2a it should be observed that in order to "linearize" a point in a segment of the $A_1\mu x$ curve it is generally necessary to add or subtract some small value to $V_B$ to "pull" $V_B$ onto the approximating straight line. Thus, for example, to use line $M_1 x$ to approximate $V_B$ at point $p_3$ on the $A_1\mu x$ curve a correction term needs to be added to $V_B$ at $p_3$ to pull it up to the value of $V_B$ at point $p_4$ on line $M_1 x$. It is possible using this summing of a correction term approach to linearize any value of $V_B$ on the $A_1\mu x$ curve. Next, referring to FIGS. 2b and 2c, it should be observed that the thickness curve in FIG. 2b exhibits a significantly greater amount of distortion than the curve in FIG. 2c. By comparing FIG. 2b with FIG. 2c further it should be clear that each curve may be represented by a set of straight lines and that the range of slope values for the approximating straight line sets varies with curve distortion. Given a finite set of slope values it will be shown hereinafter that varying the slope value range with known curve distortion for a given type of material conserves linearization system memory.

Figure 3:
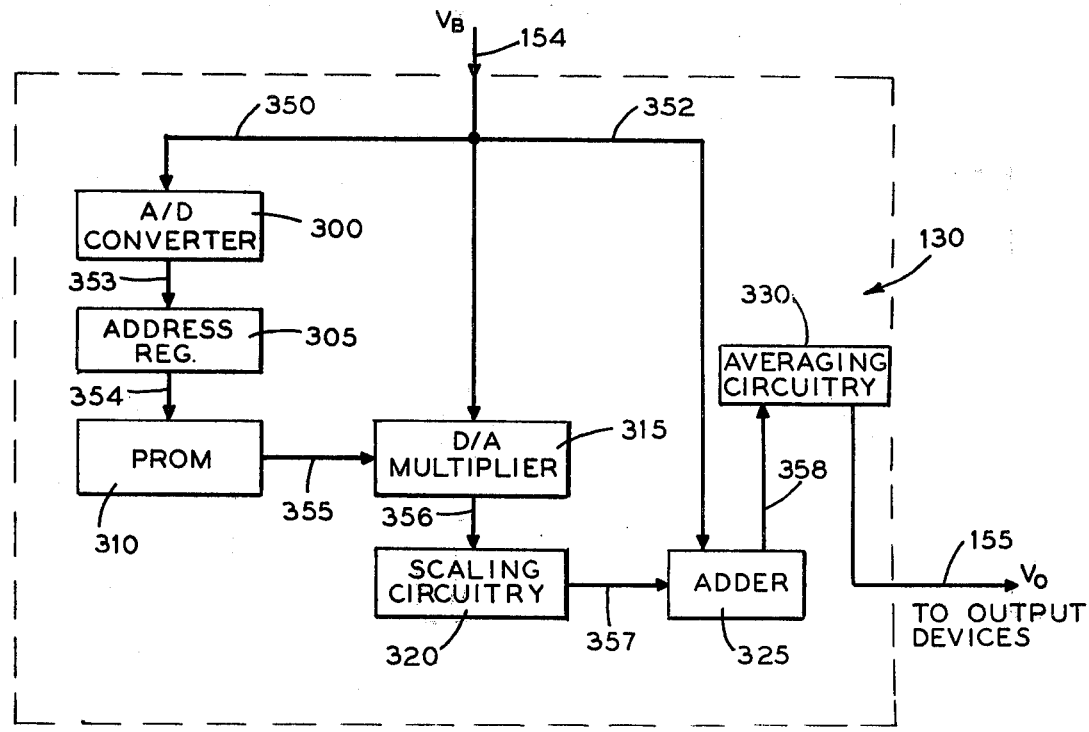
FIG. 3 depicts a linearization system built in accordance with the teachings herein.

FIG. 3 depicts an illustrative embodiment of the linearization system contemplated herein which may be used to: (1) develop a correction term directly related to the segment of a non-linear thickness curve in which $V_B$ lies; (2) develop a correction term with the same resolution inherent in the $V_B$ signal; and (3) develop a correction term as a function of known thickness curve distortion.

Referring now to FIG. 3 it should be recalled that $V_B$ is input to system 130 via link 154. It should be observed that the non-linear input signal, $V_B$, is "split" or channeled into three separate circuits in system 130. The first circuit is shown comprised of an A/D converter 300, address register 305 and PROM 310. The second circuit is shown comprised of a D/A multiplier 315 and scaling circuitry 320. The third circuit is shown comprised of an adder, 325. The broad function of each of the three separate circuits will first be discussed.

The first circuit uses $V_B$ directly to locate a correction coefficient. Recall that each possible value of $V_B$ on a given segment of a non-liner thickness curve is associated with a precalculated correction coefficient. The coefficients are determined by well known modeling techniques and after being determined are each stored, according to the preferred embodiment of the invention, in some type of memory system.

The first circuit locates the appropriate correction coefficient and supplies it to the second circuit to develop the correction term, that is the quantity to be added to or subtracted from $V_B$ to linearize it in the manner described above with reference to FIGS. 2a – 2c.

In order to develop a high resolution correction term the second circuit multiplies the located correction coefficient directly times the high resolution $V_B$ signal. Since the correction term is a product signal with one of the terms being the high resolution $V_B$ signal, the correction term itself is a high resolution signal. It should be noted that according to the invention $V_B$ has now been used twice in the linearization process, once to look up the correction coefficient and once again to develop the correction term.

The second circuit may also be used to scale the correction term. As indicated hereinabove scaling is desirable to vary the correction term range to conform with known thickness curve distortion characteristics. Again, this minimizes system memory requirements since only one correction coefficient set (presumably for some nominal material thickness curve) need be computed and stored in the memory system.

Finally, the third circuit is used to sum the correction term (positive or negative) with $V_B$ directly to achieve a correction signal having the same high resolution as $V_B$. Note once again that $V_B$ is used directly (the third time) in the conversion process to maintain high resolution in each signal developed.

One other circuit is depicted in FIG. 3, averaging circuit 330. The description of the function of this last circuit will be deferred until after a discussion of the structure and interaction of the units comprising the three separate circuits shown in FIG. 3.

According to the illustrative embodiment, $V_B$ is channeled onto links 350, 351, and 352. This effectively "splits" the $V_B$ input signal and makes it available to each of the three separate circuits. The $V_B$ signal on link 350 is translated via A/D converter 300 into a digital signal which is used to address PROM 310. PROM 310 is an example of a memory system suitable for storing the correction coefficient set as a set of digital signals.

Recall that all values of $V_B$ in a given segment of the non-linear thickness curve for an object are translated into a single memory address. This single address is input to address register 305, coupled to A/D converter 300 via link 353. Address register 305 serves as a temporary holding register for the address and further functions to inhibit a new coefficient signal from being output by PROM 310 for a predetermined period of time. The rate at which the PROM is addressed corresponds to a desired sample rate at which linearization is to be performed and is, of course, arbitrary.

Once an appropriate correction coefficient is located, PROM 310 outputs the coefficient signal to D/A multiplier 315 via link 355. A/D multiplier 315 converts the digital coefficient signal to an analog signal and multiplies the coefficient times the analog $V_B$ signal on link 351. The output of D/A multiplier 315 is then coupled to scaling circuit 320 via link 356. Scaling circuitry 320 need be nothing more than a voltage divider network the values of which may be selected according to known thickness curve distortion characteristics. The purpose of scaling circuitry 120 is to permit modifications of the correction term range as discussed above.

Finally, adder 325 sums the correction term signal on link 357 (possibly scaled) with the $V_B$ signal channeled onto link 352. The result is a linearized signal output on link 358 which inherently possesses the same high resolution as the $V_B$ input signal.

Each of the devices shown in FIG. 3 are commercially available as "off the shelf" components. In particular, suitable components for a gauge that operates with $V_B$ in the zero to ten volt range include a FMI 105 BIN-P A/D converter, a SN 74174 address register, a SN 74186N PROM and a AD562 KD/BIN A/D multiplier. As indicated hereinbefore the scaling circuitry may be realized by a simple voltage divider network and adder 225 may be realized using a LM 308A amplifier.

In order to compensate for possible errors introduced into the linearized signal by radiation source noise the preferred embodiment of the invention averages a preselected number of linearized signals in order to develop the final linear output signal $V_o$. Averaging circuitry for this purpose is shown coupled to adder 325 via link 358. Circuitry 320 may be realized by commercially available low pass filters.

$V_o$ is a high resolution linear output signal which may be utilized by a variety of output devices, shown coupled to the radiation gauge via link 155, to accurately display the thickness of an object.

What has been described above is a linearization system for a radiation gauge which operates in a dynamic manner, i.e., without reference to a standard or sample object. The disclosed gauge operates with minimal memory and computing power requirements. Still further, the gauge features scaling the correction term range as a function of known non-linear thickness curve distortion characteristics and compensating for possible errors introduced into the linearization process by radiation source noise.

While a preferred embodiment of the present invention has been described modifications and equivalents may become apparent to those skilled in the art. Accordingly, it is not desired to limit the invention to this disclosure. Rather, it is intended that the invention be limited only by the scope and spirit of the appended claims.

What is claimed is:

1. In a radiation gauge for measuring the thickness of objects, apparatus for converting a thickness representative non-linear analog signal to a thickness representative linear analog signal exhibiting the same degree of resolution inherent in said non-linear signal, comprising:
    a. memory means for storing a set of precalculated correction coefficient signals each of which is associated with a preselected range of possible values for said non-linear signal;
    b. addressing means responsive to said non-linear signal to address said memory and output the stored coefficient signal associated therewith;
    c. correction term generator means, coupled to said memory means, responsive to both said non-linear signal and said output coefficient signal to develop a correction term signal exhibiting the same degree of resolution inherent in said non-linear signal; and
    d. summing means, coupled to said generator means, responsive to said non-linear signal and said correction term signal to develop a linearized signal exhibiting the same resolution inherent in said non-linear signal.

2. Apparatus as set forth in claim 1 wherein said memory means comprise a programmable read only memory in which said coefficient signals are stored in digital format.

3. Apparatus as set forth in claim 2 wherein said correction term generator means comprises a digital to analog multiplier operative to convert a digital format coefficient signal to an analog coefficient signal and form the product of said analog coefficient signal with its associated non-linear analog signal.

4. Apparatus as set forth in claim 3 wherein said correction term generator means further comprises scaling circuitry for varying the range of possible correction term signals.

5. Apparatus as set forth in claim 1 wherein said addressing means comprises an analog to digital converter responsive to said non-linear signal to develop a digital memory address signal.

6. Apparatus as set forth in claim 5 wherein said addressing means further comprises an address register coupled to said analog to digital converter for storing said digital address signal and for maintaining a constant memory output over a predetermined time period.

7. Apparatus as set forth in claim 1 further comprising an averaging circuit, coupled to said summing means, for averaging said linearization signal over a period of time to develop an accurate linear analog output signal.

8. In a radiation gauge for measuring the thickness of objects, apparatus for converting a thickness representative non-linear analog signal to a thickness representative linear analog signal exhibiting the same degree of resolution inherent in said non-linear signal, comprising:
  a. a programmable read only memory for storing a set of precalculated correction coefficient signals each of which is associated with a preselected range of possible values for said non-linear signal;
  b. a digital to analog converter responsive to said non-linear signal to address said memory and output the stored coefficient signal associated therewith;
  c. a digital to analog multiplier, coupled to said memory, responsive to both said non-linear signal and said output coefficient signal to develop a correction term signal exhibiting the same degree of resolution inherent in said non-linear signal;
  d. scaling circuitry, coupled to said multiplier, for varying the range of possible correction term signals by generating a scaled correction term signal;
  e. summing means, coupled to said scaling circuitry, responsive to said non-linear signal and said scaled correction term signal to develop a linearized signal exhibiting the same resolution inherent in said non-linear signal; and
  f. averaging circuitry, coupled to said summing means, for averaging said linearized signal over a period of time to develop an accurate linear analog output signal.

9. In a radiation gauge for measuring the thickness of objects a method for converting a thickness representative non-linear analog signal to a thickness representative linear analog signal exhibiting the same degree of resolution inherent in said non-linear signal, comprising the steps of:
  a. storing a set of precalculated correction coefficient signals, each of which is associated with a preselected range of possible values for said non-linear signal, in a memory;
  b. converting said non-linear signal into an address signal representing the location in said memory of the coefficient signal associated therewith;
  c. outputting the coefficient signal stored at the memory location represented by said address signal;
  d. developing a correction term signal exhibiting the same degree of resolution inherent in said non-linear signal by forming the product of said non-linear signal and the output coefficient signal; and
  e. summing said non-linear signal and said correction term signal to develop a linearized signal exhibiting the same degree of resolution inherent in said non-linear signal.

10. The method as set forth in claim 9 which includes the further step of averaging said linearized signals over a period of time to develop an accurate linear analog output signal.

11. The method as set forth in claim 9 further comprising the step of scaling the correction term signal as a function of known distortion characteristics of the thickness curve for the object being gauged.

* * * * *

UNITED STATES PATENT OFFICE
CERTIFICATE OF CORRECTION

Patent No. 4,064,396  Dated December 20, 1977

Inventor(s) Joseph A. Panarello

It is certified that error appears in the above-identified patent and that said Letters Patent are hereby corrected as shown below:

Column 1, line 43, change "$0 \leqq V_1 \leqq 10$" to --$0 \leq V_1 \leq 10$--.

Column 1, line 54, change "mullivolt" to --millivolt--.

Column 5, line 38, after the word "$A_1 \mu x$" insert --)--.

Signed and Sealed this

Thirtieth Day of May 1978

[SEAL]

Attest:

RUTH C. MASON  
Attesting Officer

LUTRELLE F. PARKER  
Acting Commissioner of Patents and Trademarks